Nov. 7, 1944.    P. E. CATE    2,362,353
ELEMENTS OF COMPRESSED AND SINTERED POWDERS
Filed Aug. 29, 1942
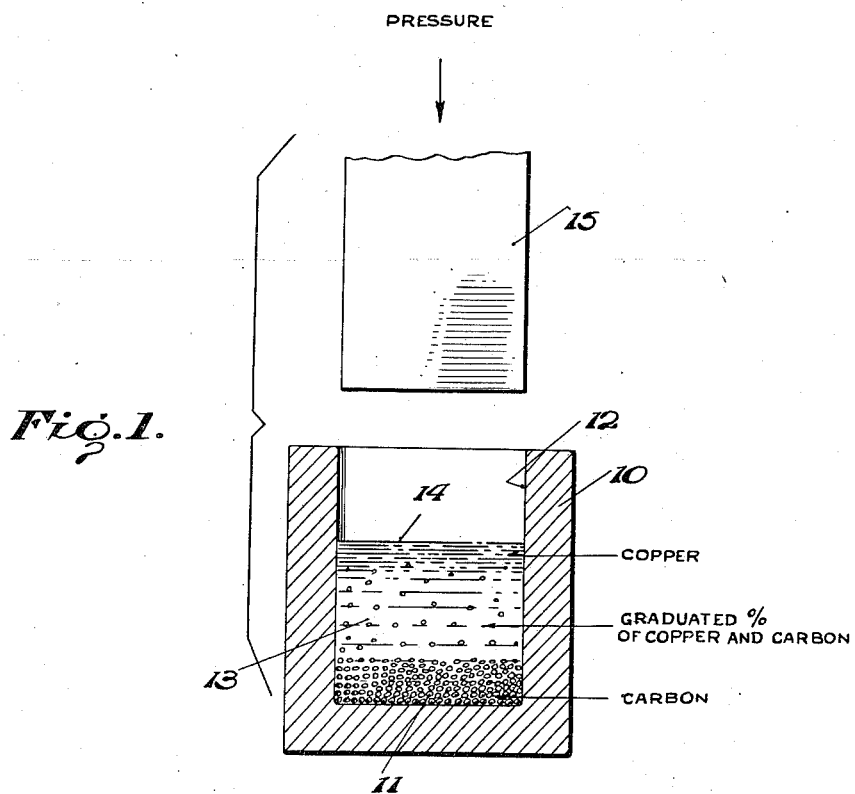
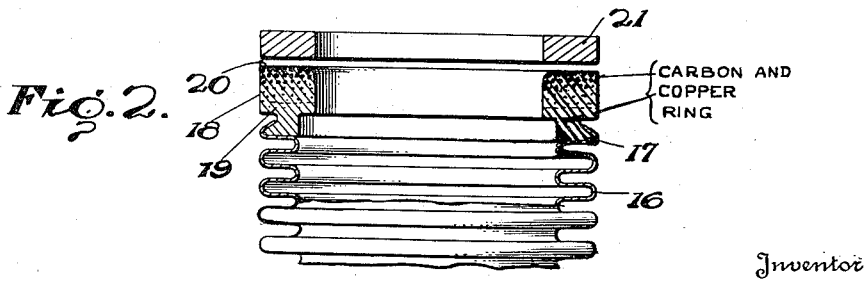
Inventor
Paul E. Cate
By Cameron, Kerkam & Sutton
Attorneys Patented Nov. 7, 1944

2,362,353

UNITED STATES PATENT OFFICE 2,362,353

ELEMENTS OF COMPRESSED AND SINTERED POWDERS

Paul E. Cate, Knoxville, Tenn., assignor to The Fulton Sylphon Company, Knoxville, Tenn., a corporation of Delaware Application August 29, 1942, Serial No. 456,697

5 Claims. (Cl. 288—2)

This invention relates to the production of elements from the powders of dissimilar materials, particularly metallic and nonmetallic materials, and is of special utility in the production of bearing or wearing elements for association with metallic bellows.

It has heretofore been proposed to provide a wide variety of elements by compressing and sintering the powder of the component material, and in order to obtain characteristics due to the presence of dissimilar materials, it has been proposed to form certain elements from mixtures of the powders of the desired components. The present invention has for its object the production of elements, particularly bearing or wearing elements, from the powders of dissimilar materials to obtain improved characteristics in the resulting product.

Exemplifying the present invention by its application to the production of bearing or wearing rings for association with metallic bellows, it has heretofore been the practice, when a bellows is to be employed as a seal in a structure wherein there is relative movement between the bellows and a part with which the bellows co-operates to provide a wearing or bearing ring at the end of the bellows for engagement with the part where relative movement is to exist. Such parts are ordinarily made of steel or similar hard metals, whereas the bellows are conventionally made of brass or similar soft metals. To withstand the wear at the bearing surface of the steel or like metal parts, the bearing ring associated with the bellows has been made of a similar hard metal, which has presented problems of proper attachment to the end of the brass bellows to effect a permanent joint notwithstanding the difference in the two metals, their different coefficients of expansion, etc.

It is an object of this invention to provide a wearing or bearing ring as referred to which at its face for attachment to the bellows is possessed of characteristics such as to facilitate its attachment to the metal bellows while at its opposite or bearing face it is possessed of characteristics such as to assure durability, low friction losses, etc.

A further object of this invention is to provide a wearing or bearing ring as referred to which is porous and self-lubricating at its bearing surface, as well as resistant to heat and wear, while at its surface for attachment to the bellows it is malleable, easily soldered or welded to the metal of the bellows or an end member thereon, and possessed of characteristics which are sufficiently like those of the metal of the bellows to avoid differential expansion and otherwise overcome the problems heretofore present when the two metals are materially different.

Other objects will appear as the description of the invention proceeds.

Broadly stated, the present invention includes the production of a wearing or bearing element from powders having materially different characteristics so as to take advantage of their different characteristics at the opposite extremities of such an element while the differences in the characteristics of the dissimilar materials are progressively graded off from the respective extremities toward the opposite extremities so as to produce an intermediate zone in which no abrupt change in characteristics is present.

More specifically, the present invention involves the production of a wearing or bearing ring for association with metallic bellows which at one face may be composed of pure metal, as copper or other suitable metal, whereby it is malleable and readily soldered or welded to the metal of the bellows, and at its opposite face may be composed of pure carbon so as to be hard, porous, self-lubricating, and heat and wear-resistant, while the characteristics due to the presence of these materials in the body of the ring are progressively tapered off between the end faces.

The accompanying drawing illustrates diagrammatically the production of such a bearing ring and its use, Fig. 1 being a schematic view to illustrate the production of the ring from dissimilar powders; and Fig. 2 being a diagrammatic view of the end of a bellows provided with a bearing or wearing ring of the present invention.

Further exemplifying the invention by its embodiment in a bearing or wearing ring for association with a bellows, it is desirable that the face of the ring which is to be attached to the bellows shall be only of metal of such character that it possesses the requisite malleability and capacity to be readily soldered or welded to the metal of the bellows, the particular metal used preferably being the same as or similar to the metal of which the bellows is composed so as to possess the same or similar coefficient of expansion and other characteristics of the metal of the bellows. At its opposite extremity which is to engage a part where relative movement is to occur, it is desirable that the bearing element have a face composed only of material which is hard so as to be wear-resistant, self-lubricating, heat-resistant, porous, etc., as characterize bearing surfaces which are to endure for a relatively long time under the wear of relative movement and without introducing undue friction, becoming overheated, etc. For the latter purpose, pure carbon has been found by experience to be a highly desirable if not the best material to satisfy the foregoing purposes. Owing to the dissimilar characteristics of the metal and the carbon, however, it is undesirable that there be an abrupt change from one to the other of these two materials. On the other hand, if such a bearing ring is composed of a mixture of these two materials the presence of the metal in the pores of the carbon at the wearing face and the presence of the carbon distributed through the metal at the face which is to be welded or soldered to the metal at the bellows introduce difficulties and undesirable characteristics which to a considerable extent defeat the advantages obtainable from the use of the dissimilar materials.

In conformity with the present invention such a ring as referred to is built up as follows: Referring to Fig. 1 of the accompanying drawing, any suitable container 10 of any suitable size and shape has a layer of carbon particles 11 applied to the bottom of the chamber 12 in said container, the size of the carbon particles being such as is suitable, under principles well understood, in the production of elements from powder under heat and pressure as in powder metallurgy. Superimposed on the layer 11 are a plurality of layers of mixtures of carbon powder and metal powder, as copper powder, the size of the particles of copper also being selected in conformity with well understood principles applied in powder metallurgy. These superimposed layers, which may be referred to as intermediate layers, and which are generally indicated at 13, are characterized by a progressive decrease in the percentage of carbon as successive layers are introduced and by a progressive increase in the percentage of metal as successive layers are introduced. Any suitable number of these intermediate layers may be used depending upon the number of gradations desired in the decreasing percentage of the carbon and increasing percentage of the metal. Finally, at the top a layer of metal particles only is applied at 14. Thus the mass so formed is characterized by a layer of carbon only at the bottom, a layer of metal only at the top, and intermediate layers wherein the percentage of carbon from the bottom up decreases from 100% to 0% while the percentage of metal increases from 0% to 100%. If desired, a suitable hydride may also be incorporated in the powder. While from the foregoing description the carbon has been introduced first and succeeding layers are graded off to metal, it is apparent that the metal could be put in first and the succeeding layers graded off to carbon.

The powdered mass so formed is then subjected to relatively great pressure, as by the plunger diagrammatically indicated at 15, so as to compact the mixture into a briquette of suitable shape and thickness. This briquette is then sintered in any suitable way until the particles thereof are formed into a coherent mass, the sintering being performed at temperatures below the melting point of the constituent substances, all as well understood in powder metallurgy. The resulting block, ring, etc., is then suitably machined to produce the wearing or bearing ring or other element depending on the use to which the composite material is to be put.

Referring to Fig. 2, a bellows 16 of any suitable material is shown as provided with a ring 18 made in conformity with the present invention and having a layer of copper at 19 where it is soldered or welded to the bellows and a layer of carbon at its outer face 20 where it is adapted to have bearing engagement with an opposed surface, here diagrammatically indicated by the ring 21, with graded carbon and copper in between as above explained.

If preferred, the layer of metal indicated at 14 in Fig. 1 may be made of sufficient depth so that it may be shaped at 17, as shown in Fig. 2, to facilitate attachment directly to the end of the bellows. Also, in place of copper, the powder used may be brass of the same composition as used in the bellows so that the characteristics of the two metals where united may be identical.

A bearing ring formed as described has a face 20 that is only carbon so that it has the porous, self-lubricating, wear and heat-resistant characteristics desirably possessed by bearing elements, while its opposed extremity is composed only of metal which may be of the same as or similar characteristics to the metal to which it is attached by welding or soldering. Intermediate the two extremities there are graded mixtures so that the characteristics of this intermediate portion merge gradually, and without abrupt change, into the characteristics of the unmixed materials at the extremities.

The present invention, therefore, has overcome the difficulties heretofore encountered in providing a bellows with a bearing or wearing ring which may be readily welded or soldered thereto, on the one hand, and which is possessed of hard, self-lubricating, and wear and heat-resistant characteristics at the face at which relative movement is to occur.

While the invention has been illustrated schematically by the appended drawing, it is to be expressly understood that it is not limited thereby. The layers of powder may be built up into the aforesaid mass in any suitable container depending upon the shape, size, thickness, etc., of the element to be produced, pressure may be applied to the powder in any suitable way, the sintering can be carried out by any suitable operation, and the resulting product may be subjected to any suitable fabricating operation and applied to its associated parts by any suitable means of mounting or attachment. Reference is therefore to be had to the appended claims for a definition of the limits of the invention.

What is claimed is:

1. A bearing or wearing ring for attachment to a bellows having opposed faces of dissimilar materials one face being of a material similar to the material of the bellows and the other face being of a material of different character and the body of said ring intermediate said faces being composed of mixtures of said materials in which the constituents are progressively graded from a maximum of one to a maximum of the other.

2. A bearing or wearing ring for association with a bellows having opposed faces composed of metal and wear-resistant material, the body of said ring being composed of mixtures of said materials wherein the metal progressively decreases from the metal face and the wear-resistant material progressively decreases from the wear-resistant face.

3. A bearing or wearing ring for association with a bellows having at one face a layer of metal which is at least similar to the metal of which the bellows is composed, and having at its opposite face a layer of carbon, the body of said ring being composed of mixtures of said two materials wherein the carbon progressively decreases away from said carbon face and the metal progressively decreases away from the metal face.

4. A bearing or wearing ring for association with a bellows having a layer of carbon constituting the bearing or wearing face, a body in which the carbon content progressively decreases away from said bearing or wearing face and which includes progressively increasing amounts of metal, and a metal face at its extremity opposite from said bearing or wearing face.

5. A bearing or wearing ring for association with a bellows composed of compressed and sintered powders and having at its opposite extremities faces of carbon and metal with an intermediate body portion composed of mixtures of carbon and metal wherein the percentage of the carbon progressively decreases away from the carbon face and the percentage of metal progressively decreases away from the metal face.

PAUL E. CATE.